Dec. 9, 1969     H. C. GOHS     3,482,857
THREADLESS COUPLER FOR JOINING ELECTRICAL CONDUIT OR THE LIKE
Filed Oct. 28, 1966     2 Sheets-Sheet 1
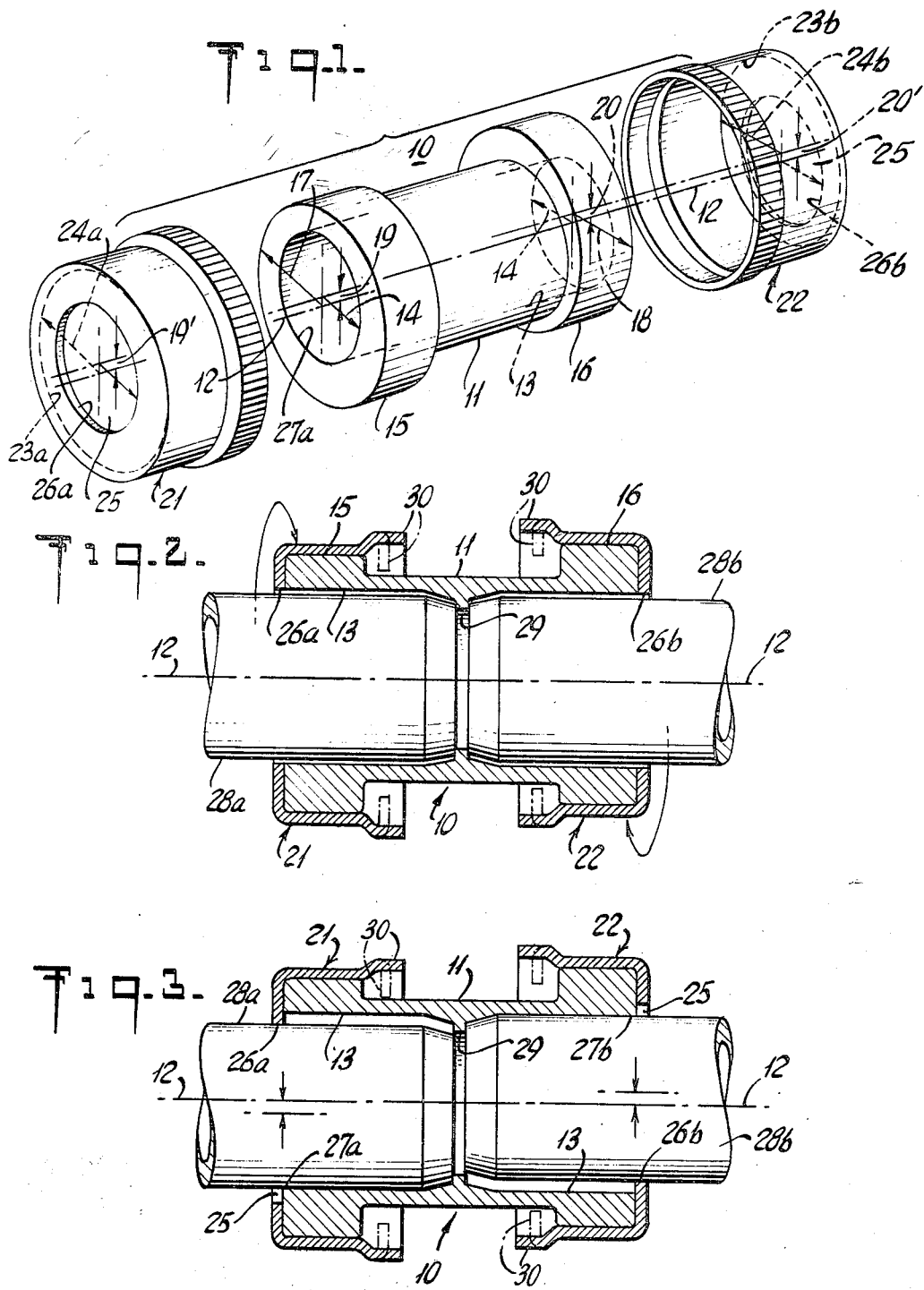
INVENTOR
HOWARD C. GOHS
BY
ATTORNEY

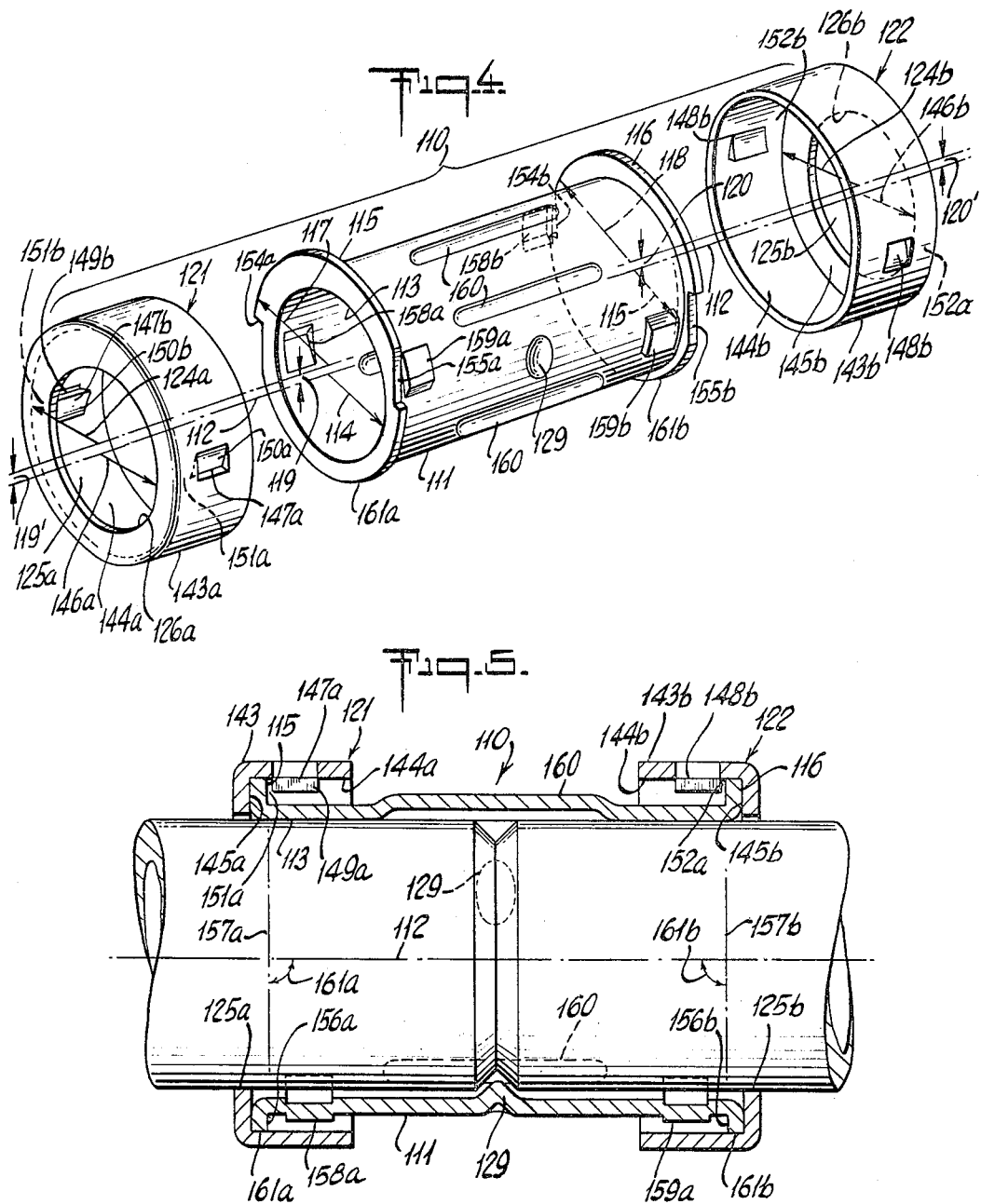

United States Patent Office 3,482,857
Patented Dec. 9, 1969

3,482,857
THREADLESS COUPLER FOR JOINING
ELECTRICAL CONDUIT OR THE LIKE
Howard C. Gohs, Syosset, N.Y., assignor to Electrical
Fittings Corporation, Farmingdale, N.Y., a corporation
of New York
Continuation-in-part of application Ser. No. 381,819,
July 10, 1964. This application Oct. 28, 1966, Ser.
No. 596,377
Int. Cl. F16l 55/00, 21/00, 25/00, 35/00
U.S. Cl. 285—178                              3 Claims

ABSTRACT OF THE DISCLOSURE

A threadless coupler for joining electrical conduit, having a body and cap member. The body has an upstanding flange with a surface eccentric to the axis of body and which engages the cap for allowing the cap member to turn to alternate operative positions with respect to the axis of the body. The cap and body have mutually co-acting edges for conditionally gripping the conduit and for releasing the same in response to the alternate operative position of the cap. The cap gripping surface is eccentric to the axis of the cap.

This invention relates to threadless couplers for joining electrical conduit or the like. This application is a continuation-in-part application based upon the previously filed United States patent application Ser. No. 381,819, filed July 10, 1964, and now abandoned.

The prior art offers many couplers for electrical conduit. Most, however, have threads or, if threadless, are relatively involved and complex with respect to manufacture, fabrication, assembly and use of same.

The present invention is directed to a threadless coupler for joining electrical conduit, having a body and a cap member. The body has an upstanding flange with a surface eccentric to the axis of the body and which is engaged by the cap for allowing the cap member to turn to alternate operative positions with respect to the axis of the coupler body. The cap and body have mutually coacting edges for conditionally gripping the conduit and for releasing the same in response to the alternate operative position of the cap. The cap gripping surface is eccentric to the axis of the cap.

An object of this invention is a reliable coupler which is easy to make and quick to install.

A further object of this invention is a coupler that would pass standard tests for couplers of electrical conduit or the like.

Further objects and advantages will become apparent from the description of the invention taken in conjunction with the figures, in which:

FIG. 1 is a perspective view of an embodiment of the invention in exploded form;

FIG. 2 is a longitudinal sectional view of the invention with electrical conduit to be joined seated in the coupler prior to clamping of same;

FIG. 3 is another longitudinal sectional view with the connector firmly gripping and holding the electrical conduit in place;

FIG. 4 is a perspective view of a second embodiment of the invention in exploded and unassembled form; and FIG. 5 is a longitudinal sectional view of the said second embodiment with electrical conduit being firmly gripped by the coupler and is similar to the view of FIG. 3.

The FIGURES 1–3 illustrate one connector embodiment 10 of the invention. Connector 10 includes a cylindrical body 11 having a longitudinal axis 12—12. Body 11 has a through bore 13 circular in cross section with a radius 14. The center of bore 13 coincides with axis 12—12. Outer diameter flange surfaces 15, 16 are cylindrical and are located at the opposite ends of body 11. Radii 17, 18 are the radii of respective flange surfaces 15, 16. As best seen in FIG. 1, radii 17, 18 and thus the outer diameter flange surfaces 15, 16 are individually eccentrically offset with respect to longitudinal axis 12—12. The distances 19, 20 are the amount of eccentric offset between respective flange surfaces 15, 16 and axis 12—12. In addition, the foregoing offsets 19, 20 are in opposite sense at the opposite ends of coupler body 10. For example, as seen in FIG. 1, offset 19, at the left end of body 10, is above axis 12—12, whereas offset 20 is below such axis at the right-hand end of coupler body 10.

Individual cylindrical caps 21, 22 are designed for mounting over the respective flanged ends of body 10. To facilitate fabrication and to reduce the number of parts constituting a complete connector 10, it is preferable whenever possible to make caps 21, 22 identical. Each cap has a recessed inner diameter bore 23a, b of radius 24a, b. Each cap has a back wall provided with central hole or circular opening 25. In each cap, hole 25 and thus its peripheral edge 26a, b is eccentrically offset with respect to the inner diameter surface 23a, b of such cap. Each offset distance 19', 20' between the centers of a cap edge 26a, b and its inner bore 23a, b is equal to the offset distance 19, 20 at the correlated end of the coupler body to which such cap is designed to mount. For example, if cap 21 is designed to mount on flange 15, offset 19' is equal to offset 19. Similarly, if cap 22 is designed to mount on flange 16, offsets 20' and 20 are equal.

In addition, the diameters of the cap holes 25 are selected to be equal to the correlated entrance diameter of bore 13. For example, the diameter of cap edge 26a is equal to the diameter of the peripheral edge 27a of bore 13 in the end plane of body 11. Peripheral edge 27a is shown in FIG. 1. The same relationship holds between the diameter of cap edge 26b and the confronting peripheral bore edge 27b at the other end plane of body 11.

The diameter of cap bore 23 and the diameter of the correlated flange surface on which the cap is designed to mount are selected to produce a rotatable fit therebetween such that the mounted cap is easily rotated manually relative to body 11 by the technician during connection of conduit to connector 10.

If the caps 21, 22 are not permanently attached to coupler body 11, a cap is mounted over the end of electrical conduit 28. The conduit 28 is then inserted into coupler bore 13. The cap is then mounted over its flange surface as shown in FIG. 2. The illustrated embodiment has a threadless coupler connection at each end for connecting two tubular conduits 28a, b, hence the foregoing assembly takes place at both ends of the connector. An annular stop 29 in bore 13 limits the depth of conduit penetration in bore 13.

Caps 21, 22 are preferably permanently captivated to body 11 by bending in cap edges 30 at the open ends of same to extend over the back of the respective flanges as shown in dashed outline in FIGS. 2 and 3. This may be done at the factory, and prevents loss of the caps. Captivation of the caps does not prevent rotation of same about body axis 12—12 for the clamping operation described hereinafter. When a cap is captivated to body 11, it is necessary to align its hole 25 with bore 13 before inserting the conduit into the connector or for removing the conduit therefrom. Preferably the caps are aligned in the factory and held in their correct aligned position by friction.

To permit insertion of a conduit 28 into a coupler, or to permit mounting of the non-captivated caps on their respective flange surfaces, the caps are rotated about axis 12—12 to cause their respective hole edges 26 to coincide in alignment with the adjacent bore edges 27. It will be understood that coupler parts are dimensioned so that the conduit outside diameter fits snugly through cap holes 25 and through the entrance edges 27 of body bore 13 with a very small clearance therebetween. The electrician then individually grips each cap and turns same in opposite directions about axis 12—12. For example, and as indicated by the respective arrows in FIG. 2, cap 21 is turned out from the plane of the drawing and cap 22 is turned into the plane of drawing.

By reason of the foregoing eccentric relationship between the coacting bodies, as the caps turn a portion of each cap edge 26 is cammed to bear and clamp against the outer diameter surface of the conduit extending therethrough to grip same. Such turning motion causes the opposite edge portion 27 of bore 13 to press and clamp against the outer diameter surface of conduit 28. Essentially, conduit 28 becomes clamped between diametrically opposite coacting edge portions 26, 27 of a cap and body 11. The clamp is completed within a half turn of each cap on its flange surface.

FIG. 3 shows the results of turning caps 21, 22 in opposite directions. Edges 26a, b of respective caps 21, 22 are cammed to clamp and grip conduits 28a, b, thus firmly joining same.

As understood, the diameters of the bore of the connector body and the cap hole are selected to pass the conduit outer diameter therethrough. In one working embodiment of the embodiment of FIGS. 1–3, bore 13 has a .710 inch diameter and cap hole 25 is substantially the same size. The offset dimensions such as 19, 20, 19', 20' are each .015 inch. The foregoing coupler dimensions are designed to connect with conduit having a standard .70 inch outer diameter. It will be understood that the foregoing dimensions will clamp conduit as small as .68 inch outer diameter because the cam action causes cap edge 26 to travel a maximum of .030 inch at its maximum clamping offset position with respect to bore 13. When a cap is positoned on its flange bearing surface with its hole 25 aligned to coincide with bore edge 27 and then rotated therefrom about the axis 12—12 one half turn, cap edge 26 is cammed a maximum of .03 inch with respect to body bore 13.

FIGURES 4 and 5 illustrate a second connector 110 embodying the invention. Some of the portions of the parts of the second embodiment are similar to those of the first embodiment. The connector 110 includes a tubular cylindrical body 111 having a longitudinal axis 112—112. The body 111 has a through bore 113 circular in cross section with a radius 114. The body 111 has a plurality of exterior elongated protrusions 160 which aid in gripping and turning the body. The center of bore 113 coincides with axis 112—112.

The body 111 has upraised external flanges 115 and 116 on its ends. These flanges 115 and 116 are preferably of the same thickness as the material of the body 111, are integral with the body 111, and are turned-up portions of the body 111. The flanges have an exterior edge 161a, b which is relatively narrow and flat. The edge 161a, b of the flanges 115 and 116 is round when viewed along the axis 112—112. Radii 117, 118 are the radii of the edges 116a, b of flanges 115, 116. The radii 117, 118 and thus the outer diameter of flanges 115, 116 are individually eccentrically offset with respect to the longitudinal axis 112—112. The offset distances 119, 120 are the amount of eccentric offset between the respective flanges 115, 116 and the axis 112—112. The offset distances 119, 120 are preferably in the same sense and location at the opposite ends of the coupler body 111. The offset distance 119, at the left end of coupler body 111, is above axis 112—112 and offset distance 120 is also above such axis 112—112 at the right-hand end of coupler body 111.

Individual cylindrical caps 121, 122 are designed for mounting over the respective flanges 115, 116 of body 111. Preferably the caps 121, 122 are identical.

Each cap 121 and 122 has an elongated cylindrical tubular portion 143a, b. The inner radius of tubular portion 143a, b is 124a, b. Radius 124a, b is taken from the axis 112—112 of the caps 121, 122 to the inner wall 144a, b of the tubular portion 143a, b. The tubular portion terminates in an internal flange 145a, b. The flange 145a, b forms a central hole 125a, b. The hole 125a, b has a radius 146a, b taken from the axis of the hole 125a, b to the inner periperal edge 126a, b of the flange 145a, b. The inner peripheral edge 126a, b is eccentrically offset with respect to the inner wall 144a, b of such cap. Each offset distance 119', 120' between the axial centers of cap edge 126a, b and the axis 112—112 of its tubular portion 143a, b is equal to the offset distance 119, 120 at the correlated end of the coupler body to which such cap is designed to mount. For example, the diameter of the cap edge 126a is equal to the diameter of the peripheral edge 127a of bore 113 in the end plane of body 111.

Caps 121, 122 are preferably permanently captivated to body 111 by means of two protrusions 147a, b and 148a, b on the inner wall 144a, b of each cap. The protrusions preferably have an edge 149a, b along a radius of the bore and a tailing edge 150a, b. Although two protrusions are shown, only one or more than two may be used. Each protrusion 147, 148 forms a groove 151a, b, 152a, b, respectively, between its camming edge 153a, b and the inner wall of flange 145a, b.

The width of the grooves 151a, b and 152a, b are selected so that they are slightly larger than the width of the flange 115a, b. The flange 115a, b has as many indentations 154a, b and 155a, b as there are protrusions on its corresponding cap. Two such indentations are shown in the illustrated embodiment of FIGS. 4 and 5. The indentations 154a, b and 155a, b correspond in shape to the cross section of the protrusions 147a, b and 148a, b. However, the protrusions are slightly larger than the indentations requiring that the cap 121, 122 be force-fitted over the flange 145a, b. This fitting preferably takes place in the factory. The cap 121, 122 is snapped into position over the flange 145a, b and that position, preferably, correctly aligns the holes so that conduit may be inserted without re-alignment prior to use.

The protrusions 147a, b and 148a, b ride on the back edge 156a, b of the flanges 115 and 116. The flange 115a, b is perpendicular relative to the walls of the body 111. In other words, a plane 157a, b passing through the flange 115a, b is at a right angle 161a, b to the axis 112—112. Stops 158a, b and 159a, b on body 111 prevent the cap from being turned too far. If the cap were turned more than one-half a turn, the conduit would begin to be released. Captivation of the caps does not prevent rotation of same about body axis 112—112 for the clamping operation described hereinafter. When a cap is captivated to body 111, due to the alignment of the protrusions 147a, b, 148a, b and the indentations 154a, b and 155a, b, the caps are captivated so that the electrician need not align its hole 125a, b with bore 113 before inserting the conduit into the connector.

The width of flanges 115, 116 and grooves 151, 152 and the diameter of the outer flange surface 134 on which the cap is designed to turn are selected to produce a rotatable fit therebetween such that the mounted cap is easily rotated manually relative to body 111 by the technician during connection of conduit to connector 110.

To permit insertion of a conduit 28 into the coupler of FIGS. 4 and 5, the caps have been aligned during assembly about axis 112—112 to cause their respective hole edges 126a, b to coincide in alignment with the adjacent bore edges 127a, b. It will be understood that coupler parts are dimensioned so that the conduit outside diameter fits snugly through cap hole 125a, b and through the entrance edge of body bore 113 with a very small clearance therebetween. The electrician then individually grips each cap and turns them in the same direction about axis 112—112. For example, and as indicated by the respective arrows in FIG. 5, caps 121 and 122 are turned out from the plane of the drawing.

By reason of the foregoing eccentric relationship between the coacting bodies, as the caps turn, a portion of each cap edge 126a, b is cammed to bear and clamp against the outer diameter surface of the conduit extending therethrough to grip same. Such turning motion causes the opposite edge portion 127a, b of bore 113 to press and clamp against the outer diameter surface of conduit 28. Essentially, conduit 28 becomes clamped between diametrically opposite coacting edge portions 126, 127 of a cap and body 111. The clamp is completed within a half turn of each cap.

In one working embodiment of the embodiment shown in FIGS. 4 and 5, bore 113 has a diameter of .718 inch. The offset dimensions such as 119 and 120 are .018 inch. These coupler dimensions are designed to connect with the conduit, having a .70 inch outer diameter. The length of the coupler body, taken along axis 112, is 1.310 inches. The coupler body is preferably pressed out of 19 gage sheet steel. The width of the grooves 151a, b and 152a, b is .039 inch.

In the two illustrated embodiments of the invention, the clamping operation may be carried out manually; however, the grip becomes sufficiently tight to require the use of a wrench for disconnection, in which case the caps are rotated against the arrow directions as depicted in FIGS. 2 and 5 for relieving the clamping pressure on the conduit.

Essentially the invention comprises a coupler body and a cap member, each having mutually engaging surfaces such as 15 and 23 and 115 and 151 for allowing the cap member to turn to alternate operative positions with respect to axis 12—12 and 112—112. In addition, said body and cap member each have mutually coacting edges such as 27 and 26 and 127 and 126 for conditionally gripping the conduit and for releasing same. It will be noted that edges 26 and 126 are integral parts of the cap members. Similarly, edges 27 and 127 are integral parts of bodies 11 and 111. By reason of the foregoing described geometrical eccentricity between the coacting parts, when a cap is at one operative position on its flange surface, the coacting cap and bore edges coincide to allow the insertion of a conduit into bore 13 or 113 or the removal therefrom. However, when a cap is turned to some other position away from the aligned position, the coacting edges 26, 27 and 126, 127 of the cap and bore are relatively cammed into a clamping status to grip the outer diameter surface of conduit 28, thereby firmly attaching same to connectors 10 or 110. To release conduit 28, one should turn the cap back to its original position. By suitably designing the connector for specific outer diameter conduit size, it will be found that the grip connection will occur within one half turn of a cap on its bearing flange surface. Consequently, this requires reverse turning of the cap in order to cam the clamping edges into a coinciding status to permit removal of conduit 28.

The above are two embodiments of the invention; many other embodiments are possible. The following illustrates in outline form some variations. It is to be understood that these variations may be combined with the above embodiments and with each other in numerous combinations.

The outer shape of body 11 or 111 need not be cylindrical as this plays no part in the operation of the coupler.

The two caps need not be identical to each other nor need the two flanges 15, 16 or 115, 116 be identical to each other, and the two sections of bores 13 and 113 need not be the same size as one may want to join conduits of two different sizes together. All that is necessary is that each cap make a rotatable fit over its respective flange.

Bores 13 and 113 need not be circular; they merely need to be able to accept conduit.

Either or both holes 25 and 125 in the caps need not be circular. They must be large enough to pass conduit and position same so that when the caps are turned within one half turn, the coacting edges of the hole and bore will clamp into said conduit.

The bore cross section need not be uniform throughout the length of bodies 11 and 111 as one may want to join a larger conduit to a smaller one.

One may want to build a coupler which embodies the invention only at one end and at the other end employ some form of standard connector, wall mount, or some other electrical fitting.

Providing the eccentricities at flanges 115, 116 in the same direction makes coupler 110 easy to use but this is not necessary.

The flanges and caps need not be cylindrical. All that is necessary is that each cap fit on its respective flange and that each cap is capable of being turned to two operative positions, one in which the conduit can be inserted or removed easily, the other in which the conduit is gripped firmly relative to the body.

It is possible to have a coupler with more than two flanges so that three or more conduits may be joined to one coupler.

The foregoing invention may be used to clamp rigid wall conduit, electrical malleable tubing known as emt, flexible armored cable and conduit, and also rubber sheath wire. The offset is selected so that it provides a good clamping leverage to permit a person to clamp the pipe to the connector by manually turning an end cap. A larger turning and leverage force on the end cap is required if the offset is increased. When the pipe diameter is almost as large as the bore diameter, too large an offset dimension will cause clamping to occur within a very small turning of the end cap and thus requires too much hand leverage to be practical.

When using a connector for connection to rubber sheathed conduit wire in accordance with the invention, an offset of $1/32$ inch is preferable to account for compression of the rubber sheath. In addition, it is preferable to draw a raised shell on the caps to prevent edges 126a, b from cutting into the rubber cable. The shell may be in the form of an outward extension of edge 126a, b. Such an extension may be made by rolling, on a die, a round bead outward from edge 126a, b and integral with it.

The connector body and its end cap may be made of any suitable material such as metal, either stamped or die cast, or plastic material.

What is claimed is:

1. A stamped threadless coupler of metal for joining electrical conduit or the like, comprising:
    (A) a connector body having an inner bore defined by a wall of said connector body extending therethrough from a first end to a second end for receiving a section of conduit to be joined thereto, said body having a flange extending exteriorly from said first end with an outer surface in eccentric relationship with respect to said inner bore, at least one portion of said body being deformed outwardly forming a limit protuberance proximate said first end;
    (B) a cap having a tubular portion with an internal cylindrical surface larger in diameter than said connector body flange and mounted on said body flange for relative rotation thereto, said cap having an interiorly directed flange integral with said tubular portion and defining an axial opening in eccentric relation with respect to the cap cylindrical surface, said cap cylindrical surface rearward of said body flange being deformed inwardly forming at least one locking protuberance restraining said cap and body against substantial movement axially of each other when relatively rotated, and said locking protuberance cooperating with said limit protuberance on said body limiting the relative rotation of said cap and body from a conduit accepting position to a conduit locking position; so that relatively rotating said cap and body moves the cap flange about an eccentric axis for gripping the conduit.

2. A threadless coupler as defined in claim 1, and further comprising:
(A) a second exterior flange on said connector body at the opposite end of the bore from said first flange, said second flange having an outer surface in eccentric relationship with respect to said inner bore;
(B) a second cap having a tubular portion with an internal cylindrical surface mounted on said second body flange for relative rotation therewith, said cap having an interiorly directed flange integral with said tubular portion and defining an axial opening in eccentric relationship with said second cap cylndrical surrface, said cap cylindrical surface having at least one locking protrusion inwardly directed and rearwardly positioned of said second body flange restraining said cap and body against substantial movement axially of each other when relatively rotated.

3. A threadless coupler as in claim 1, wherein said wall defining said connector inner bore has an annular stop for limiting the depth of conduit penetration.

References Cited
UNITED STATES PATENTS

| | | | |
|---|---|---|---|
| 1,558,334 | 10/1925 | Boss et al. | 285—394 |
| 2,074,393 | 3/1937 | Hixon | 287—136 |
| 2,546,157 | 3/1951 | Hume | 287—136 |
| 2,818,280 | 12/1957 | Budnik | 285—394 |
| 2,851,288 | 9/1958 | Kinkead | 285—424 X |
| 3,075,792 | 1/1963 | Franck | 285—178 |
| 3,233,927 | 2/1966 | Dewhirst | 285—424 X |

DAVID J. WILLIAMOWSKY, Primary Examiner

DAVE W. AROLA, Assistant Examiner

U.S. Cl. X.R.

285—417, 420, 424